US006930769B1

(12) United States Patent
Davis et al.

(10) Patent No.: US 6,930,769 B1
(45) Date of Patent: Aug. 16, 2005

(54) OPTICAL SENSOR MODULE TESTER

(75) Inventors: Clay Davis, Redondo Beach, CA (US); Alex Aguirre, San Diego, CA (US)

(73) Assignee: PointSource Technologies, LLC, Solana Beach, CA (US)

( * ) Notice: Subject to any disclaimer, the term of this patent is extended or adjusted under 35 U.S.C. 154(b) by 310 days.

(21) Appl. No.: 10/394,986

(22) Filed: Mar. 21, 2003

Related U.S. Application Data

(60) Provisional application No. 60/366,703, filed on Mar. 21, 2002.

(51) Int. Cl.[7] ............................ G01J 1/00; G01C 21/02
(52) U.S. Cl. .................... 356/213; 250/203.5; 250/200
(58) Field of Search ................................. 356/213–224, 356/338, 340–343; 250/203.5, 200, 559.3, 250/206.1

(56) References Cited

U.S. PATENT DOCUMENTS

| | | |
|---|---|---|
| 3,770,351 A | 11/1973 | Wyatt |
| 3,901,602 A | 8/1975 | Gravatt et al. |
| 4,070,113 A | 1/1978 | Frazer et al. |
| 4,173,415 A | 11/1979 | Wyatt |
| 4,265,538 A | 5/1981 | Wertheimer |
| 4,548,500 A | 10/1985 | Wyatt et al. |
| 4,565,448 A | 1/1986 | Abbott et al. |
| 4,702,598 A | 10/1987 | Böhmer |
| 4,728,190 A | 3/1988 | Knollenberg |
| 4,906,094 A | 3/1990 | Ashida |
| 4,907,884 A | 3/1990 | Wyatt et al. |
| 4,942,305 A | 7/1990 | Sommer |
| 4,952,055 A | 8/1990 | Wyatt |
| 4,987,539 A | 1/1991 | Moore et al. |
| 5,125,737 A | 6/1992 | Rodriguez et al. |
| 5,247,340 A | 9/1993 | Ogino |
| 5,305,071 A | 4/1994 | Wyatt |
| 5,414,508 A | 5/1995 | Takahashi et al. |
| 5,436,465 A | 7/1995 | Borden et al. |

(Continued)

OTHER PUBLICATIONS

"Recent Overview Article—Aerosol Characterization Research at the University of Hertfordshire", by Prof. Paul Kaye, STRC Particle Instruments Research Group, Science and Technology Research Centre,University of Hertfordshire, Hatfield, United Kingdom, reproduced from the Aerosol Society Newsletter, No. 33, Sep. 18-20, 1998.

(Continued)

*Primary Examiner*—Gregory J. Toatley, Jr.
*Assistant Examiner*—Roy M. Punnoose
(74) *Attorney, Agent, or Firm*—Leon D. Rosen

(57) ABSTRACT

A method and apparatus are provided for testing a photodetector (20) that has a narrow field of view (A) and an alignment surface (50), to determine whether the field of view and the axis (52) of the field of view are precisely what is expected or deviates therefrom. While the photodetector views a region or zone (102), a narrow spot of light (82) is moved into and out of the zone and across the zone, while the output of the photodetector is monitored. The narrow spot of light is generated by focusing a small spot of light onto a surface. The small spot of light can be a spot of light on an oscilloscope monitor (80) which scans the spot back and forth in a raster pattern. To create a very small spot, the image on the oscilloscope monitor is focused to a greatly reduced size spot image (124) onto the surface that the photodetector views.

14 Claims, 4 Drawing Sheets

U.S. PATENT DOCUMENTS

| | | |
|---|---|---|
| 5,534,999 A | 7/1996 | Koshizuka et al. |
| 5,627,040 A | 5/1997 | Bierre et al. |
| 5,737,078 A | 4/1998 | Takarada et al. |
| 5,999,256 A | 12/1999 | Jones et al. |
| 6,023,324 A | 2/2000 | Myers |
| 6,100,541 A | 8/2000 | Nagle et al. |
| 6,118,531 A | 9/2000 | Hertel et al. |
| 6,120,734 A | 9/2000 | Lackie |
| 6,313,908 B1 | 11/2001 | McGill et al. |
| 6,421,121 B1 | 7/2002 | Haavig et al. |
| 6,608,293 B2 * | 8/2003 | Kuderer .................. 250/200 |

OTHER PUBLICATIONS

"Discrimination of phytoplankton via light-scattering properties", by Phillip J. Wyatt and Christian Jackson, Limnology And Oceanography, 34(1), 1989, pp. 96-112, American Society of Limnology and Oceanography, Inc.

* cited by examiner

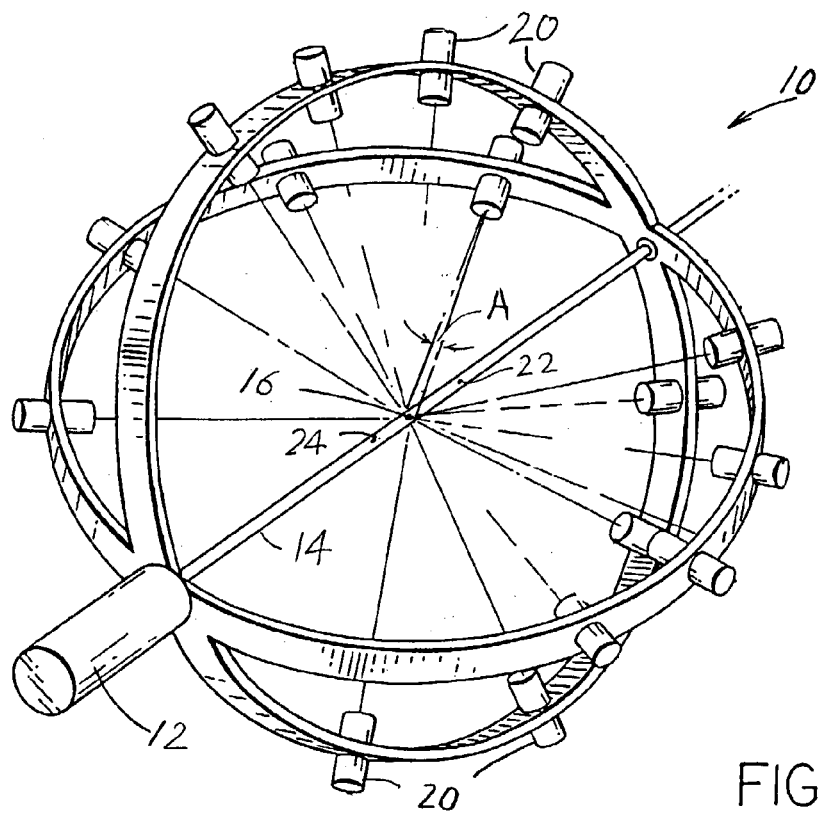
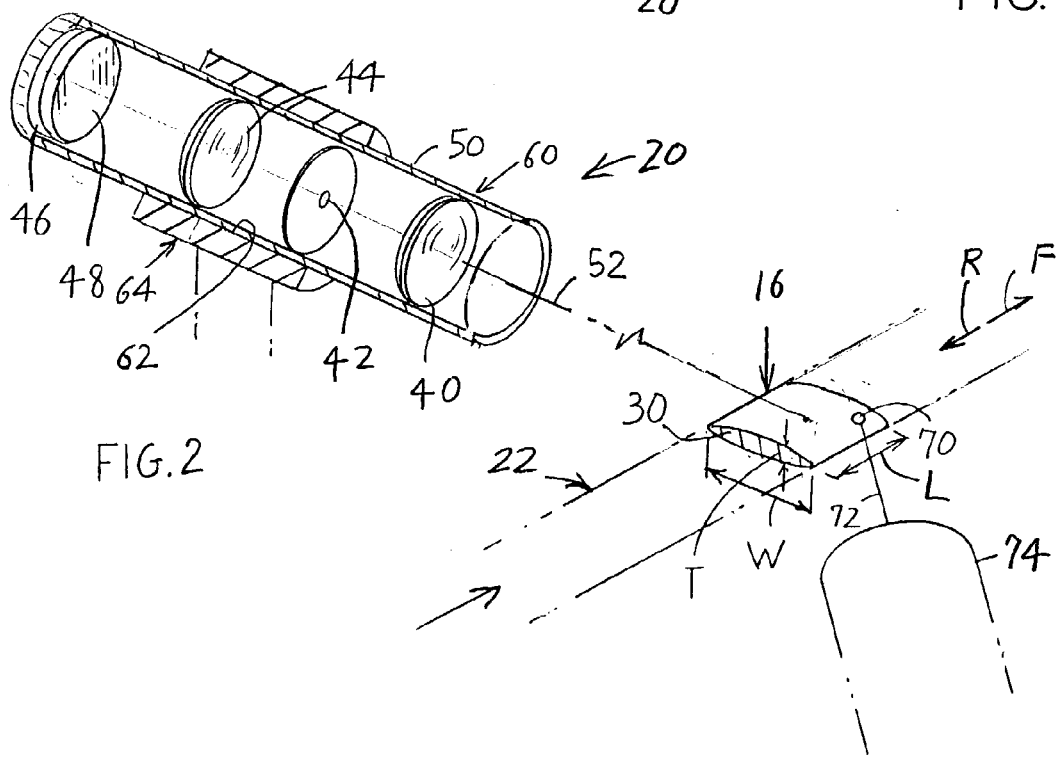

US 6,930,769 B1

OPTICAL SENSOR MODULE TESTER

CROSS-REFERENCE TO RELATED APPLICATION

Applicant claims priority from U.S. Provisional Application Ser. No. 60/366,703 filed Mar. 21, 2002.

BACKGROUND OF THE INVENTION

A system for identifying microscopic particles in a fluid such as water, includes a light source such as a laser that directs light through a small detect zone, while particles in the fluid occasionally pass through the detect zone. When a particle passes through the detect zone, it scatters light. One or more photodetectors detect light scattered in a particular direction, and the scattering pattern can be used to detect and/or identify the particle. Each photodetector or group of them, has an alignment surface with an axis, such as the outside of a tube that encloses lenses and a photocell, that should be precisely aligned with the axis of the field of view. The field of view should be neither greater nor smaller than expected.

The detect zone that one or many photodetectors view, may be small, such as with a width and length each of 1.5 mm. It is important that when the alignment surface axis points at the detect zone, that a photodetector view substantially only the detect zone to detect light scattered from a particle passing through the zone. If the photodetector should detect light from outside the zone or not detect light scattered towards it from the zone, then the system would generate false readings. In one system, each of numerous photodetectors have a field of view that is only about 1.5°±0.5°. A method and apparatus that enabled a precise determination of the actual field of view of a photodetector, and the angle (if any) between the axis of the field of view and the axis of an alignment surface, in a simple and rapid manner, would be of value.

SUMMARY OF THE INVENTION

In accordance with one embodiment of the present invention, a method and apparatus are provided for rapidly determining the extent of the view of field of a photodetector, and especially its field of view with respect to an alignment surface of the photodetector. A screen is established in the field of view of the photodetector, and a narrow spot of light is established on the screen. The narrow spot of light can be moved into and out of the expected field of view of the photodetector. The output of the photodetector is monitored to determine when its output suddenly falls, which indicates that the spot of light is moving out of its actual field of view.

The spot of light can be formed on the screen by generating a spot of light on the monitor of an oscilloscope and focusing an image of the monitor surface onto the screen, with the image being of greatly reduced size. A circuit that drives the oscilloscope can be made to drive the spot in a raster pattern, and the output of the photodetector can be connected to another monitor that creates at least a two-dimensional image indicating the amplitude of the spot as it moves along the width and length of an area on the screen. Instead of forming the image on a screen, a virtual image can be generated.

In one system, the photodetector includes an alignment surface such as a cylindrical sleeve with an axis which is intended to lie precisely concentric with the axis of the field of view of the photodetector (which is expected to have circular cross-sections). The photodetector can be removed and placed in a test mount, to check the field of view, and to check whether the axis of the field of view is coaxial with the axis of the sleeve alignment surface. In another system, where the photodetectors are intended to detect light scattering in different directions from particles at a detect zone of a particle identifying apparatus, the screen or a virtual image is placed at or close to the detect zone and the photodetectors remain in the positions in which they are actually used.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a system for identifying microscopic particles, which includes photodetectors that the present system tests.

FIG. 2 is an enlarged view of the detect zone of the system of FIG. 1, and a sectional view of one of the photodetectors of FIG. 1, and indicating one method that could be used to test the photodetector device.

DESCRIPTION OF THE PREFERRED EMBODIMENTS

Figure 3:
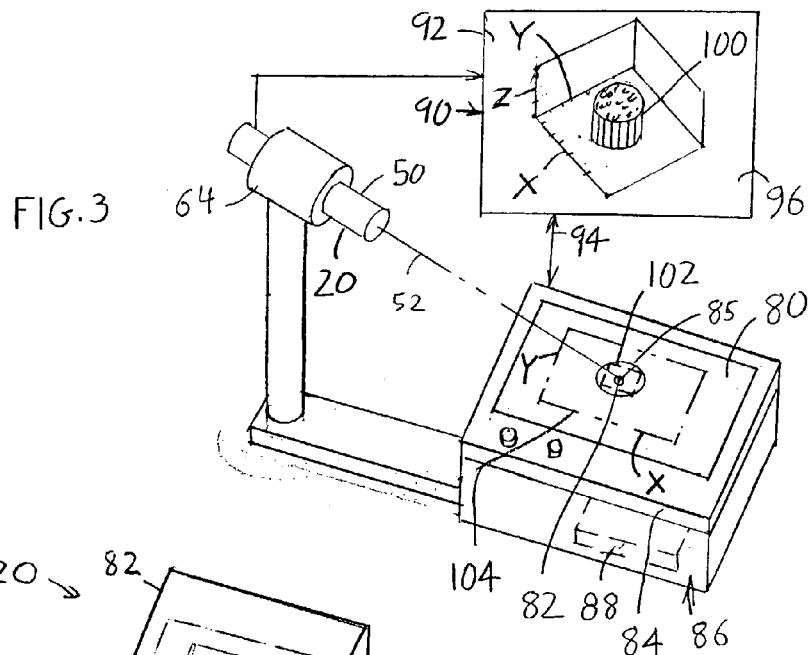
FIG. 3 is an isometric view of a test device of one embodiment of the present invention showing how it tests for the field of view of one of the photodetectors of the system of FIG. 1, and showing a display that indicates the field of view.

FIG. 1 illustrates a system 10 for identifying microscopic particles, and especially pathogens, which lie in a stream of fluid such as air or water. The system includes a light source such as a laser 12 that produces a narrow laser beam 14 that passes through a detect zone 16. Multiple photodetectors 20 are aimed at the detect zone 16 to detect light scattered by a microscopic particle passing through the detect zone. The pattern of light scattering is determining by detecting the outputs of multiple photodetector devices or photodetectors 20. The output of each photodetector indicates the amplitude of light scattered in each of multiple directions from a particle passing through the detect zone. The outputs of the multiple photodetectors 20 represent a pattern of light scatter. This pattern is compared to the pattern of light scatter for known particles when they pass through the detect zone. When there is a high correlation between the scatter pattern of an unknown particle passing through the detect zone 16, and the scatter patterns of a particular known species of particle, then the unknown particle is deemed to be of that known species of particle.

Each of the photodetectors 20 detects only light received within a narrow angle A such as 1.5° from the direction of the detect zone 16. This assures that light scattered from a particle within the detect zone 16 will be detected by the photodetector. Particles passing through other locations along the beam such at 22 and 24 will not be detected by the photodetector.

FIG. 2 shows one example, where the light of the laser beam has a wavelength of 685 mm (red light) and the microscopic particles have a size on the order of magnitude of 4 wavelengths (about 3 microns). The laser beam 22 has a cross section indicated at 30, with an average thickness T of about 0.1 mm. The small thickness T results in the microscopic particles remaining in the laser beam for only a short period of time. The detect zone 16 has a width W of about 1.5 mm and a length L along the laser beam of about 1.5 mm. It is important that each photodetector 20 detect substantially only light within the detect zone 16 which has the width W and length L, and not detect light considerably forward F or rearward R of the detect zone. Also, it is important that almost all light scattered from any location within the detect zone 16 toward a detector be detected by that photodetector 20. Furthermore, it is desirable that the photodetector produce approximately the same output for a given amount of light, regardless of where, along the detect zone 16, the light originated.

One type of photodetector, or optical sensor module 20, includes a lens 40 that directs light from the detect zone 16 through a small hole 42 in an iris, and another lens 44 that forms an image of the detect zone 16 onto a photocell 46, with a polarizing filter 48 lying in front of the photocell. Other photodetector constructions are available. The photodetector has a cylindrical outer alignment surface 50 which is intended to be precisely coaxial with the direction of viewing 52 (axis of the field of view) of the photocell. Thus, the frame 60 of the photodetector can be precisely held in a passage 62 of a mount 64, with assurance that the axis or direction of viewing 52 of the photocell will be precisely concentric with the axis of the mount 64.

It is important to test each photocell 20 to be sure that the direction of viewing 52 is coincident with the axis of its alignment surface such as the cylindrical outer surface 50. It is also desirable to be able to determine whether the output of the photocell is the same for light originating anywhere within the detect zone 16, and that the output of the photocell drops drastically when the light originates considerably outside the detect zone such as more than about 0.5 mm forward or rearward (along the laser beam direction) of the detect zone 16. Such a determination indicates the field of view of the photodetector covers the desired angle (e.g. 1.5°) in all directions, but no more, and indicates that the alignment surface 50 is precisely concentric with the axis of the field of view.

FIG. 2 illustrates a method that can be used to detect the output of the photodetector 20, which includes placing a small light-reflecting spherical probe 70 at the end of a thin wire 72 lying at the end of the support 74. The support 74 is moved to move the probe 70 to different locations within the detect zone 16, and to locations outside the detect zone such as forward and rearward of the detect zone. The output of the photodetector 20 is recorded at each of the multiple different positions of the probe 70. While this method could be used with a precision drive to move the support 74, the process would be slow. A modification is to use a tiny source of light such as the tip of an optic fiber and to move it, which also results in a slow process.

FIG. 3 illustrates one embodiment of the present invention, where the photodetector 20 is directed at a region that includes a surface 80 of a monitor 84, which can produce a narrow spot of light 82 at any desired location on the monitor. The axis of the alignment surface is directed at a centerpoint 85 of an area 102 representing the detect zone. The monitor surface 86 may be considered to be a plane, even though it curves slightly (radius of curvature less than 10% of the useful area over which the spot moves). The spot of light has an area that is a fraction (less than the whole) of the field of view, and the spot area is preferably less than half the area of the expected field of view of the photodetector. The location of the spot is defined by its coordinates in X and Y directions. Applicant prefers to use an oscilloscope 86 that includes the monitor 84. This is because the location of the spot of light 82 can be closely controlled in an oscilloscope by a driving circuit 88.

Figure 4:
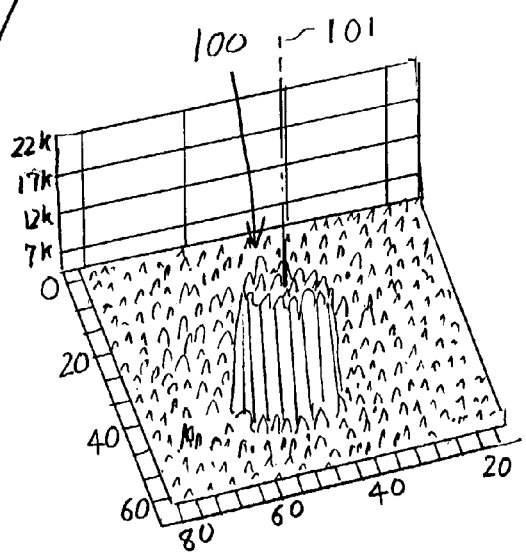
FIG. 4 is a larger view of the display of the system of FIG. 3.

With the photodetector held in a mount 64 that precisely aligns with alignment surface 50 of the photodetector, the output of the photodetector is delivered to a computer 90 which creates a display 92 on another monitor surface 96 that indicates the amplitude or output of the photocell along an axis Z as the spot of light 82 on the first monitor surface 80 moves in the X and Y directions. The computer also has an output on line 94 which drives the oscilloscope 86 to move the spot of light 82 in the X and Y directions in unison with spot movement on the display 92. The characteristics of the photodetector are indicated by the figure 100 that represents the output of the photodetector for light of a constant amplitude at different X and Y locations on the first monitor surface 80. FIG. 4 illustrates the display, or evaluation image 100 in greater detail. The vertical axis 101 extends through the point where the axis of the alignment surface 50 passes, so that axes of the alignment surface and actual field of view are coincident. A much simpler display such as the meter of a voltmeter connected to the photodetector output could be used.

The system of FIG. 3 enables a rapid determination of the characteristics of the photodetector 20 because the spot of light 82 can be quickly scanned. In one example, a small area 102 represents the detect zone of the system of FIG. 2, and lies within a larger area 104 that represents light that can originate (be scattered) from locations outside the detect zone 102. The spot of light 82 can be quickly scanned in a raster pattern, wherein it is moved back and forth along one axis such as the X axis, as it slowly advances along the other axis such as the Y axis. F*ig*. 100 on the display 92 provides an instant indication of the characteristics of the photodetector to a technician looking at the display. In practice, the spot of light 82 on a common oscilloscope is larger than desirable when determining the characteristics of a photodetector. This is especially true because a particle to be detected may have a diameter on the order of magnitude of 3 microns.

Figure 5:
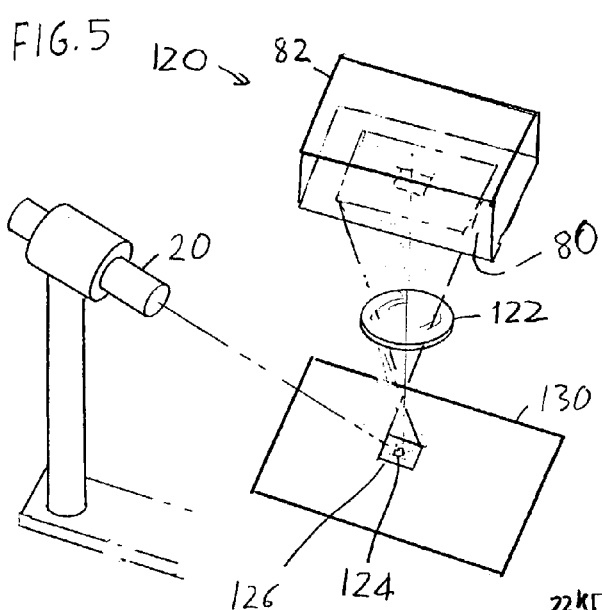
FIG. 5 is an isometric view of a system of another embodiment of the invention, similar to that of FIG. 3, but with a reduced size spot of light.

FIG. 5 illustrates another system 120 similar to that of FIG. 3, except that a scanned pattern on the monitor surface 80 of the oscilloscope 84 is reduced in size by a lens 122. This produces a moving light spot 124 of much smaller diameter, and which scans the desired area 126 on a light display surface 130 which may be the surface of a sheet of white paper. The same computer set up shown in FIG. 3 can be used to drive the oscilloscope 84 and display a figure representing the output of the photodetector 20.

The system 120 of FIG. 5 is useful when a new photodetector is received, which is to be placed in a particle identifying system such as shown in FIGS. 1 and 2. Occasionally, a photodetector is received in which the field of view is badly misaligned with its alignment surface, which the system of FIG. 5 detects. Applicant notes that the display area 126 preferably has the same width and length (1.5 mm each in FIG. 2) as the detect zone. Since the thickness of the detect zone is small (e.g. 0.1 mm), the area 126 is similar to the detect zone except that in the particle identifying system the photodetectors detect light in the horizontal plane of the laser beam (14 in FIG. 1).

Figure 6:
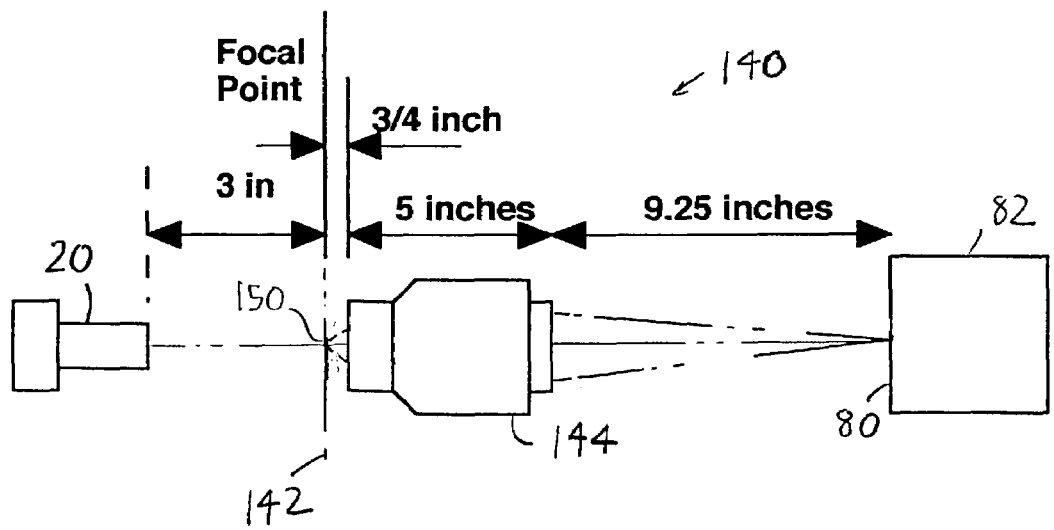
FIG. 6 is a modified side elevation view of a system similar to that of FIG. 5 but wherein a virtual image is created that is viewed by a photodetector.

FIG. 6 illustrates a modified system 140 where the moving spot of light on the face of a cathode ray tube 80 of the oscilloscope monitor, is converged to a focal point which lies on the plane 142, by an objective lens 144 (which may include a plurality of lens elements). The image at location 150 on the focal plane 142 is a virtual image of the spot on the screen 80, but reduced in diameter. The photodetector 20 detects the spot at 150, which moves in a raster pattern that represents the detect zone and areas around the detect zone, of an actual particle identification system.

Figure 7:
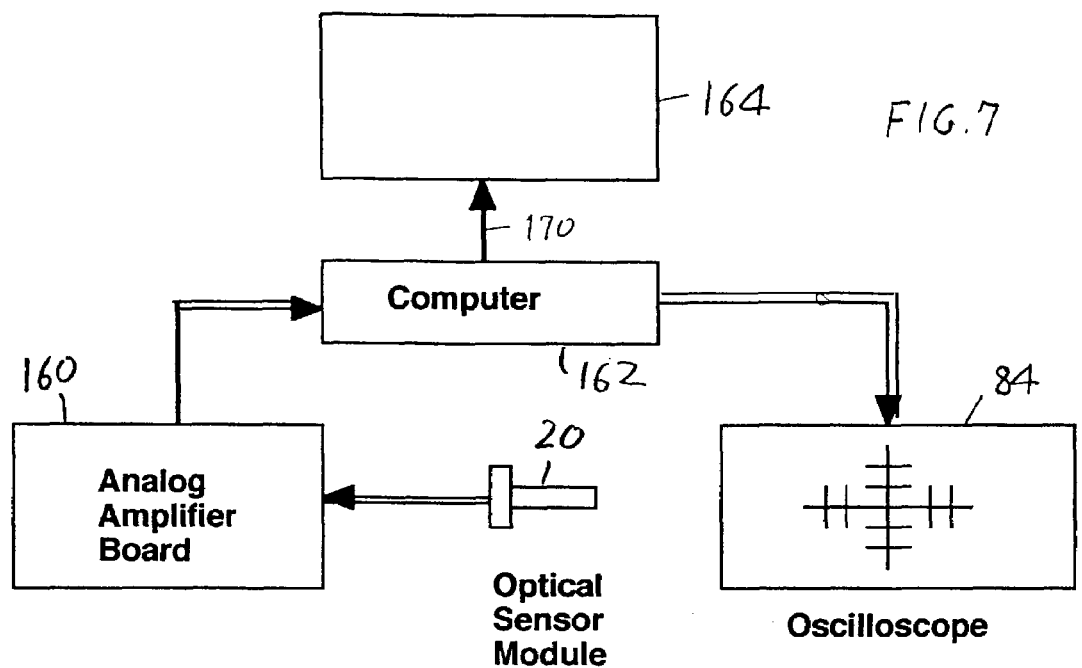
FIG. 7 is a block diagram of circuitry of the system of FIG. 6.

FIG. 7 shows the electronic processing apparatus used with the system of FIG. 6. The output of the photodetector 20 is delivered to an analog amplifier 160 which delivers its output to a computer 162. The computer drives a monitor 164 that displays the output of the photodetector by a figure on its display surface. The computer drives the oscilloscope 84.

FIG. 4 shows an output that applicant has generated that includes the figure 100 representing the output of a photodetector illuminated by the apparatus of FIG. 7. The output of the computer at 170 can be stored in a memory and used to drive a printer that generates an image such as 100 or which generates numbers representing the amplitude at each of numerous points along the X-Y axes.

Figure 8:
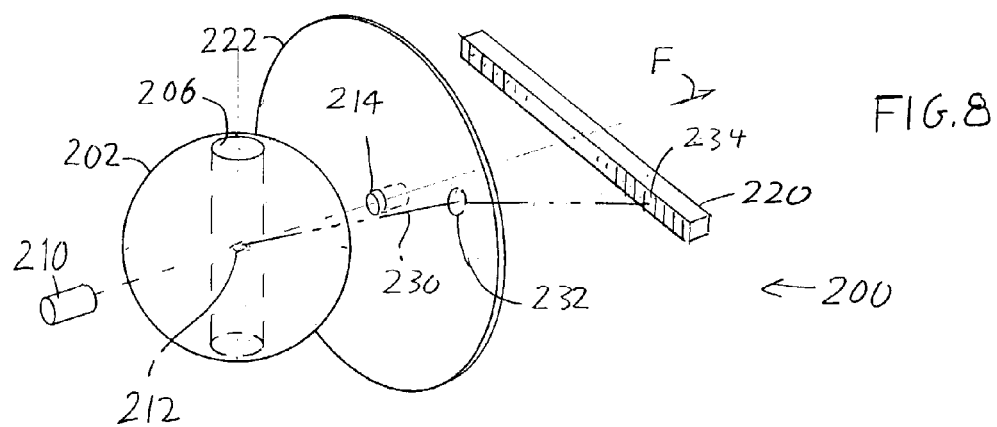
FIG. 8 is an isometric view of an identifying system with photodetectors of another construction.

FIG. 8 illustrates another system 200 for detecting particles in water. The system include a carrier 202 in the form of a glass sphere with a vertical passage 206. Light from a laser 210 passes through the sphere and through a detect zone 212 in the passage. Almost all of the light is captured by a dump 214. In one system, photodetectors are spaced around the glass sphere. In the system of FIG. 8, the photodetectors comprise a linear array 220, or row, of CCD's (changed coupled devices) that are used to detect light scattered from a particle in the detect zone 212. A holographic lens 222 is positioned forward F of the glass sphere. The holographic lens intercepts light scattered from the zone 212 and directs scattered light to each of the multiple CCD's of the row 220 of CCD's 232. For example, light scattered in the direction 230 from the detect zone reaches a small area 232 on the holographic lens 222. This area 232 of the holographic lens directs the scattered light to a particular CCD 234 of the row 220.

Figure 9:
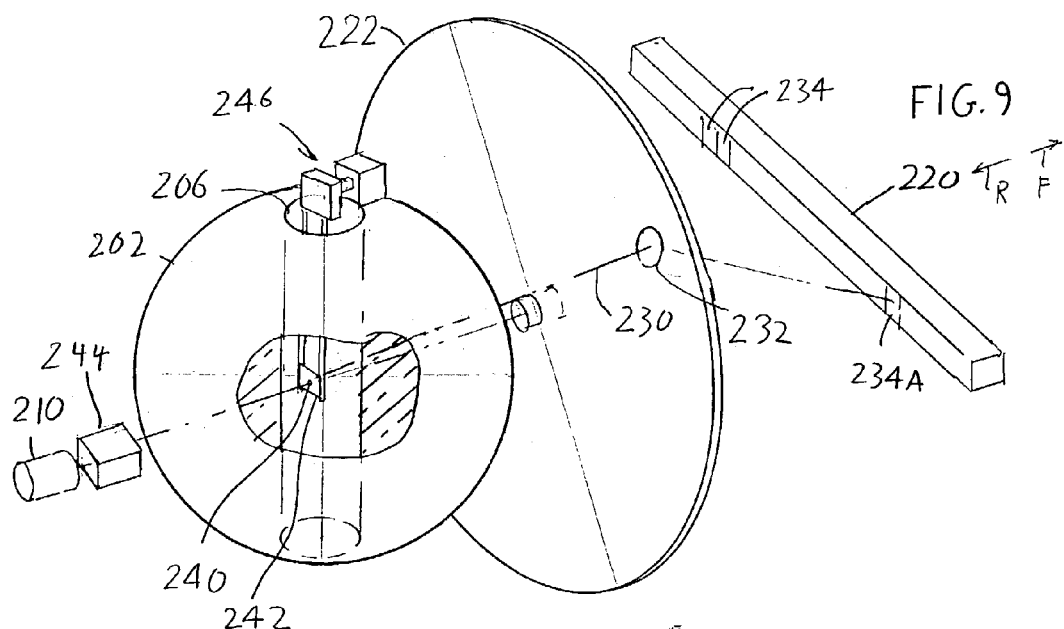
FIG. 9 is a partially sectional isometric view of the system of FIG. 8, showing a test setup for the system.

FIG. 9 shows a method by which the field of view of each of the CCD's 234 can be determined. The combination of a small area such as 232 on the holographic lens and a corresponding CCD 234A may be considered to be a photodetector. Instead of taking off a photodetector and mounting it on a test mount, applicant establishes a spot of light 240 on a small backlit screen 242 such as a piece of translucent paper with a portion that lies in the detect zone 212, in the passage 206 of the glass sphere 202. Whenever the spot of light 240 lies within the detect zone 212, it should be detected by all of the CCD's, and the outputs of each of the CCD's 234 can be monitored. In FIG. 9, a device 244 is provided that slightly changes the path of a laser beam to scan it on the screen. An actuator 246 can move the screen forward and rearward F, R so its middle passes through the detect zone.

Figure 10:
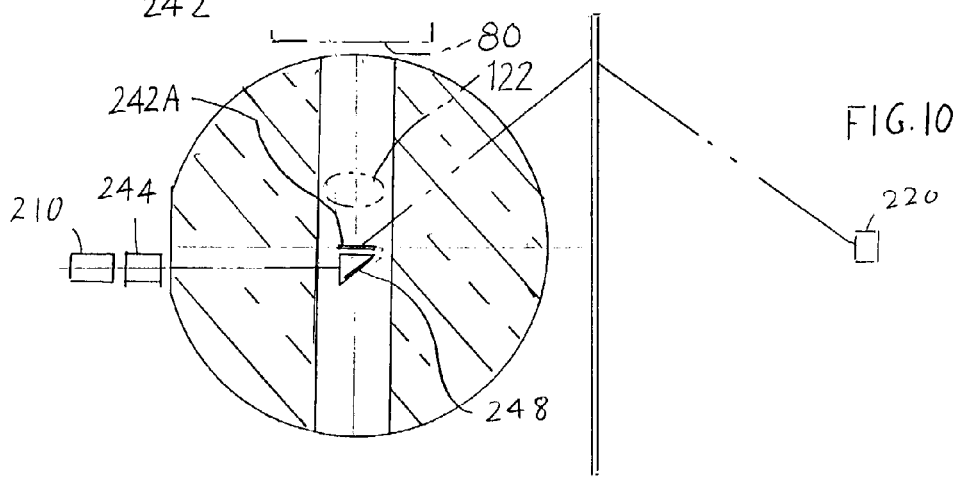
FIG. 10 is a sectional side view of a system modified from that of FIG. 9.

FIG. 10 illustrates a system similar to that of FIG. 9, but with the screen 242A horizontal and a prism 248 used to deflect the laser beam upward (or downward).

Thus, the invention provides a method and apparatus for testing a photodetector that has an alignment surface and an expected field of view and that generates an electrical output dependent upon the amplitude of light it detects, for the purpose of determining the actual field of view of the photodetector, and the axis of the field of view with respect to the axis of the alignment surface. The method includes directing the axis of the photodetector alignment surface at a plane, and generating a narrow spot of light at the plane. The plane can be moved to illuminate locations in a volume. The narrow spot of light subtends a fraction of the expected field of view of the photodetector device, such as less than one-half the area. The spot of light is moved along the plane into and out of the expected field of view of the photodetector while the electrical output of the photodetector is monitored. The spot of light can be generated by the output of an oscilloscope device, which can include an actual oscilloscope, a computer monitor, etc. which is driven to generate a spot that can be moved over the monitor surface. The size of the spot can be reduced by a lens to create a small spot that moves with precision over a small area of the desired plane. In another approach, the plane over which the image of the spot is moved, can lie at or close to the actual location from which light is scattered and which is intended to be detected by the photodetector.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for testing a photodetector that has an expected field of view and that generates an electrical output dependent on the amplitude of light it detects, for determining the actual field of view of the photodetector, comprising:
    directing said photodetector at a plane;
    generating a narrow spot of light in said plane, where said narrow spot of light subtends a fraction of the expected field of view of the photodetector, and moving said spot of light in said plane further into and out of the expected field of view of said photodetector while monitoring the electrical output of said photodetector.

2. The method described in claim 1 wherein:
    said step of generating a narrow spot of light in said plane includes operating an oscilloscope device which has a monitor surface and a circuit that generates a spot of illumination at selected locations on the monitor surface, and establishing an image of said monitor surface in said plane.

3. The method described in claim 2 including:
    optically forming a reduce size image of said monitor surface onto a screen lying in said plane.

4. The method described in claim 1 wherein said photodetector is one of a plurality of photodetectors elements which are mountable on a mount lying adjacent to a fluid carrier that forms a passage through which passes fluid with particles, and through which a laser beam is passable to shine on a particle passing through a detect zone in the passage, the photodetector elements all being aimed to detect only light scattering from the detect zone, wherein:

said plane includes a portion of said detect zone and a region immediately outside said detect zone, and said step of generating a narrow spot of light in said plane includes generating a narrow spot of light and moving it into said detect zone and immediately outside said detect zone.

5. The method described in claim 1 wherein said photodetector is one of a plurality of photodetector elements which are mountable on a mount lying adjacent to a fluid carrier that forms a passage through which passes fluid with particles, and through which a light beam is passable to shine on a particle passing through a detect zone in the passage, the photodetector elements all being aimed to detect only light scattered from the detect zone, wherein:

said step of generating a narrow spot of light includes placing a screen at a location in said passage wherein a portion of said screen lies in said detect zone and a portion of said screen lies outside said detect zone, and forming a spot of light on said screen where the spot of light has an area that subtends only a fraction of the detect zone and moving said spot through and outside said detect zone.

6. The method described in claim 1 wherein:

said step of monitoring the electrical output of said photodetector comprises generating an evaluation image on a second monitor surface, wherein said evaluation image has first and second axes representing the width and length of the actual field of view of the photodetector device and where the image also indicates the intensity of the detected light at multiple locations in said representation of the actual field of view.

7. The method described in claim 1 wherein said photodetector has an alignment surface with an alignment axis, and including:

mounting said photodetector so its alignment axis is aimed at a centerpoint on said plane, and indicating the position in the field of view of the photodetector where the spot was detected with respect to said alignment axis.

8. A method for testing the field of view of a photodetector with respect to an alignment surface of the photodetector, where the alignment surface is mountable adjacent to a fluid carrier that forms a passage through which passes fluid with particles, and through which a light beam is passable to shine on a particle passing through a detect zone in the passage, wherein the photodetector is intended to be aimed at the detect zone and to generate an electrical output representing only light originating from the detect zone and scattered toward the photodetector device, comprising:

displaying a spot of light on a plane that has a first area representing said detect zone and that has a second area that lies around said detect zone;

aligning said alignment surface so the photodetector is aimed at said first area of said plane;

moving said spot of light between said first and second areas while monitoring the electrical output of said photodetector device.

9. The method described in claim 8 wherein:

said step of displaying a spot of light includes establishing a screen on said plane and generating a moveable spot of light on a surface of an electronic monitor, and forming a reduced-size image of the surface of the monitor onto said screen.

10. The method described in claim 8 wherein:

said step of displaying a spot of light includes establishing a screen in said passage at said detect zone and displaying said spot on said screen.

11. Apparatus for testing a photodetector device that has an expected field of view, and that generates an electrical output when it detects light, to determine its actual field of view, comprising;

means for generating a spot of light that said photodetector can be aimed at, where said spot of light subtends a fraction of the field of view of the photodetector device;

said means for generating is constructed to move said spot of light in a predetermined pattern that moves through the expected field of view and to a region that surrounds and lies out of the expected field of view;

means connected to the photodetector to receive its electrical output and generate a display that shows the output of said photodetector at different positions of the spot of light.

12. The apparatus described in claim 11 wherein:

said means for generating comprises an oscilloscope device which has a monitor surface and a circuit that generates a spot of illumination at selected locations on the monitor screen.

13. The apparatus described in claim 11 wherein:

said means for generating a spot of light comprises a screen with screen portions lying in and beyond said expected field of view, and a lens that forms a reduced image of said monitor surface onto said screen.

14. The apparatus described in claim 11 including a transparent carrier having a passage, and said photodetector device is aimed at a detect zone in said carrier, and wherein said screen is positioned with a portion thereof in said detect zone.

\* \* \* \* \*